United States Patent Office 3,113,155
Patented Dec. 3, 1963

3,113,155
CHLORINATED SOLVENTS STABILIZED WITH MIXTURES OF A DIOXOLANE COMPOUND, A NITRO-ALIPHATIC COMPOUND, AND AN ALIPHATIC CARBOXYLIC ACID ESTER
Leslie L. Sims, Baton Rouge, La., assignor to Ethyl Corporation, New York, N.Y., a corporation of Virginia
No Drawing. Filed May 27, 1960, Ser. No. 32,106
19 Claims. (Cl. 260—652.5)

This invention relates to chlorinated solvents, and particularly to new and highly effective stabilized solvent compositions composed of chlorinated hydrocarbons containing mixtures of stabilizing additives, said compositions being particularly suitable for the liquid and vapor phase degreasing of metals.

Chlorinated aliphatic hydrocarbons are useful as solvents for the degreasing of metals, for dry cleaning and for many other purposes. Such solvents are particularly useful in the degreasing of metals because of their low flammability and high solvency for oils and greases. Among the most widely used of these solvents are carbon tetrachloride, ethylene dichloride, trichloroethylene and perchloroethylene. Unfortunately, however, chlorinated aliphatic hydrocarbons in general attack and cause corrosion of metallic surfaces upon contact therewith. Such attacks, which also decompose the chlorinated aliphatic hydrocarbon, occur with surprising rapidity, especially at elevated temperatures.

A highly desirable chlorinated hydrocarbon is methyl chloroform, or 1,1,1-trichloroethane, which is known to have exceptionally good solvency powers and other highly desirable properties, particularly for metal cleaning operations. Very unfortunately, however, this particular solvent also exhibits an aggravated tendency to decompose and concurrently attack metals, both at ambient or storage conditions, and at elevated temperatures suitable for cleaning operations. The reason for this marked inadequacy of 1,1,1-trichloroethane is not understood. The weakness is thought to be because of the number of chlorine atoms attached to a single carbon atom within the molecular structure of 1,1,1-trichloroethane. But whatever the explanation, the above described deficiency has deterred commercial usage of the solvent. A significant need therefore exists for stabilized chlorinated hydrocarbon compositions, particularly those suitable for the elevated temperature treatment of iron, copper, aluminum and other easily corroded metals.

It is accordingly the object of this invention to provide stabilized compositions which are highly effective for the liquid and vapor phase degreasing of aluminum, iron, copper and other metals. A particular object is to provide chlorinated hydrocarbon solvent systems which retain chemical passivity during repeated cycles of exposure to metals at processing conditions. It is an even more particular object to provide a stabilized 1,1,1-trichloroethane solvent system of the latter type. A further object is to provide additive compositions especially adapted for use in chlorinated hydrocarbons, especially 1,1,1-trichloroethane, as stabilizers therefor. Other objects will appear hereinafter.

The present invention is a solvent composition comprising a chlorinated hydrocarbon solvent having dissolved therein a minor and stabilizing amount of a mixture of an aliphatic carboxylic ester, having the general formula $R_1COOR_2$ as hereinafter defined, a nitroaliphatic compound having the general formula $R_9NO_2$ where $R_9$ is an aliphatic radical having not more than 3 carbon atoms, and a dioxolane compound having the general formula

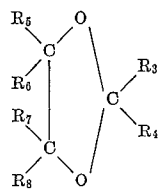

wherein $R_1$ and $R_2$ are the same or different and are aliphatic hydrocarbon radicals having not more than 3 carbon atoms; $R_3$, $R_4$, $R_5$, $R_6$, $R_7$ and $R_8$ are the same or different and are selected from a group consisting of hydrogen and methyl and ethyl hydrocarbon radicals, and wherein the summation of the substituted members does not include more than two hydrocarbon radicals.

Thus, $R_1$ and $R_2$ represent aliphatic hydrocarbon radicals selected from a group consisting of alkyl, isoalkyl, alkenyl, isoalkenyl, alkynyl and isoalkynyl hydrocarbon radicals. Specifically, compounds of the aliphatic carboxylic ester include methyl acetate, ethyl acetate, n-propyl acetate, isopropyl acetate, ethynyl acetate, 2-propynyl acetate, ethynyl propionate, ethynyl butyrate, 2-propynyl butyrate, methyl butyrate, ethyl butyrate, methyl crotonate, methyl sorbinate, methyl 3-butenate, methyl acrylate, ethyl acrylate, ethyl propiolate, isopropyl propiolate, isopropyl tetrolate, and the like; compounds of the dioxolane type include 1,3-dioxolane; 2,2-dimethyl-1,3-dioxolane; 2-methyl-1,3-dioxolane; 2,2-diethyl-1,3-dioxolane; 2-ethyl-1,3-dioxolane; 5,5-diethyl-1,3-dioxolane; 4-methyl-5-ethyl-1,3-dioxolane; 4-methyl-4-ethyl-1,3-dioxolane; 2-methyl-4-ethyl-1,3-dioxolane; 2-methyl-5-ethyl-1,3-dioxolane; and the like. The nitroaliphatic compounds include compounds such as nitromethane, nitroethane, nitroethylene, nitroacetylene, 2-nitropropane, 1-nitropropylene, 2-nitro-1-propene, 1-nitro-2-propyne, and the like.

According to a particularly preferred embodiment of the invention, the nitroaliphatic, aliphatic carboxylic ester and dioxolane compounds are blended together to form additive concentrates or corrosion inhibitor compositions. These compositions are homogeneous and essentially colorless solutions which can be rapidly and easily blended with chlorinated hydrocarbons to all desired concentrations. Furthermore, the compositions of this invention have superior storage and shipping characteristics—especially from the safety standpoint—as compared to the corresponding characteristics of the nitroaliphatic ingredients thereof. The inhibited chlorinated hydrocarbon solvent compositions formed from the above additive combinations are highly resistant both to decomposition of the solvent and to corrosion of the metals with which the solvents are placed in contact. In particular, these additive concentrates when blended with chlorinated hydrocarbon solvents form highly useful compositions for degreasing the surfaces of metals. Accordingly, another preferred embodiment of the invention is an improvement in a degreasing process wherein 1,1,1-trichloroethane is contacted with metal, the improvement being to maintain a mixture of a nitroaliphatic compound, an aliphatic carboxylic acid ester; and a 1,3-dioxolane compound dissolved within the chlorinated hydrocarbon degreasing solvent during the process.

In an especially preferred embodiment, sufficient quantities of the stabilizing mixtures, composed of a nitroaliphatic, a carboxylic acid ester and a dioxolane compound (and even more particularly nitromethane, ethyl acetate, and 1,3-dioxolane), are added to 1,1,1-trichloroethane to form compositions which are inhibited against metal-induced decomposition. These inhibited compositions are used to degrease the surfaces of metals by contacting the metals therewith.

In an even more especially preferred embodiment, sufficient quantities of the stabilizing mixtures, composed of the nitro-aliphatic, aliphatic carboxylic acid esters and dioxolane compounds (and even more particularly nitromethane, ethyl acetate and 1,3-dioxolane) are added to 1,1,1-trichloroethane to form compositions, the liquids and vapors of which are inhibited against metal-induced decomposition under metal degreasing conditions. Thus, these stabilized compositions are particularly useful in degreasing processes wherein 1,1,1-trichloroethane vapor, in equilibrium with liquid 1,1,1-trichloroethane, is contacted with the surfaces of metals.

In accordance with the practice of this invention, chlorinated hydrocarbons are provided with additive concentrates or corrosion inhibitor compositions comprising mixtures of from about 10 percent to about 80 percent of a nitroaliphatic compound, from about 10 to about 80 percent of an aliphatic carboxylic acid ester, and from about 10 to about 80 percent of a dioxolane compound, based on the total weight of the corrosion inhibitor composition. Thus, the stabilizing component present in least quantity (where quantities are not equal) is present in at least about 10 percent by weight, based on the total weight of the stabilizing mixture of inhibitors. The balance is essentially the other components of the stabilizer combination.

Because of its excellent power to inhibit chlorinated hydrocarbons, especially 1,1,1-trichloroethane, even in the vapor phase and because of its cost-effectiveness, a highly suitable corrosion inhibitor composition is one comprising from about 10 percent to about 80 percent nitromethane, from about 10 to about 80 percent ethyl acetate, and from about 10 percent to about 80 percent of 1,3-dioxolane, based on the total weight of the corrosion inhibitor composition.

These additive concentrates, or inhibiting compositions, consisting essentially of mixtures of nitroaliphatic, aliphatic carboxylic esters and dioxolane compounds when added to chlorinated hydrocarbon solvents, even in very minor quantities, form highly stable solvent compositions, which are highly beneficial for the liquid and vapor degreasing of iron, copper, aluminum and other metals. Not only are each of the components of the inhibiting compositions in themselves beneficial as stabilizers but also the stabilizer mixture produces far greater benefits than can be attributed to the use of any of the compounds alone. This multifold benefit is greatly unexpected. An especially preferred stabilized composition of this type is 1,1,1-trichloroethane containing an inhibiting amount of a stabilizing mixture consisitng of nitromethane, ethyl acetate, and 1,3-dioxolane.

Generally, it is required that the quantity of any of the components (nitroaliphatic, aliphatic carboxylic ester or dioxolane) within the stabilizing mixture should be present in at least about 10 percent by weight of the compound which is used in highest concentration. The sum total weight of the mixture of stabilizers used in any given chlorinated hydrocarbon solvent should be between about 0.3 and 12 weight percent of the solvent composition employed. Good results can be obtained when from about 1 to about 4 percent by weight of a mixture of any of the above three components are present in the chlorinated hydrocarbon solvent. Preferably, a weight concentration of the sum total or mixture of the stabilizing components is about 2 percent of the weight of the solvent employed. Generally, the individual components can be mixed together in substantially equal volumetric amounts and added to the chlorinated hydrocarbon solvents and excellent results obtained. A very satisfactory 1,1,1-trichloroethane composition is formed by adding equal volumetric amounts of nitromethane, 1,3-dioxolane and ethyl acetate thereto, which corresponds to 0.17 weight percent nitromethane, 0.15 weight percent of 1,3-dioxolane and about 0.14 weight percent of ethyl acetate. This particular combination has a stabilizing effect which far surpasses the stabilizing aspects of any of these components used individually, or of any two component mixture of these compounds.

The particular combinations of stabilizers heretofore stated are very effective with various chlorinated hydrocarbon solvents. Illustrative of these are carbon tetrachloride, ethylene dichloride, trichloroethylene, perchloroethylene, and in particular methyl chloroform or 1,1,1-trichloroethane.

As indicated above, stabilized liquid compositions of the present invention show little or no tendency to attack metals even at boiling conditions. The stabilized liquid can be stored for considerable periods of time, usually for months, in contact with aluminum, iron, copper and various metals, or alloys thereof, without significant decomposition. Also, vapors evolved from many of the stabilized liquid compositions show no tendency to attack metals. This makes many of the present solvent compositions highly effective for vapor phase degreasing operations.

For vapor degreasing applications, it is essential that the chlorinated hydrocarbon or 1,1,1-trichloroethane composition be not only stable in the liquid state but also that it be susceptible to vaporizing and condensing with full retainment of stability. This can be accomplished if an inhibitor has sufficient volatility to be carried into the vapor space in sufficient quantities to stabilize the latter without unduly depleting the liquid phase. In the intsant case the stabilizers named provide excellent vapor phase inhibitors from the standpoint of volatility because the concentration of the additives in the vapor phase is very high in relation to their concentration in the liquid phase over a considerable concentration range, beyond the concentration thereof in a chlorinated hydrocarbon solvent necessary for effective stabilization, as hereinafter expressed.

The following examples demonstrate the effectiveness of stabilized chlorinated hydrocarbon solvents, particularly 1,1,1-trichloroethane solvent in the liquid and vapor phase even at threshold conditions. In each of the demonstrations tared polished strips of aluminum, iron and copper metals were placed in glass flasks. The lower ends of the strips were immersed in the liquid and the upper end exposed only to the vapors. The strips were exposed to the boiling solvent for one and one-half hours and at the end of this time were dried and reweighed. Corrosion is measured by the observed loss of weight of the individual metal strips.

The following example demonstrates the benefits derived from a stabilized 1,1,1-trichloroethane composition.

EXAMPLE I

Runs 1, 2 and 3 demonstrate the advantages derived from the use of ethyl acetate, 1,3-dioxolane and nitromethane individually. Run 4 demonstrates the advantages derived from the use of the three component mixture of ethyl acetate, 1,3-dioxolane and nitromethane. Thus, for iron, the benefits derived from the use of this three component mixture is approximately 28-fold the advantages derived from the use of ethyl acetate alone, 10-fold the advantages derived from the use of 1,3-dioxolane alone and 8-fold the advantages derived from the use of nitromethane alone. For copper, the advantages derived from the use of the three component mixture is approximately 22-fold greater than the advantages derived from the use of ethyl acetate alone, 3-fold the advantages derived from the use of 1,3-dioxolane alone and over 2-fold the advantages derived from the use of nitromethane alone. For aluminum, the advantages derived from the use of the three component mixture is amazing. For example, the advantages derived are 450-fold over the use of ethyl acetate alone, 30-fold over the use of 1,3-dioxolane alone and 50-fold over the use of nitromethane alone.

*Table 1*

| Run | Weight Concentration of Components Added | | | | Weight Percent Loss of Metal Strip | | |
|---|---|---|---|---|---|---|---|
| | Nitromethane | Ethyl Acetate | 1,3-Dioxolane | Total Concentration | Iron | Copper | Aluminum |
| 1 | 0.0 | 0.41 | 0.0 | 0.41 | 0.17 | 0.48 | 25.0 |
| 2 | 0.0 | 0.0 | 0.40 | 0.40 | 0.063 | 0.061 | 1.6 |
| 3 | 0.51 | 0.0 | 0.0 | 0.51 | 0.049 | 0.055 | 2.7 |
| 4 | 0.17 | 0.14 | 0.15 | 0.46 | 0.006 | 0.022 | 0.056 |

Having demonstrated the advantages derived from the use of a tri-component mixture of an aliphatic carboxylic ester, a dioxolane compound and a nitroaliphatic compound in 1,1,1-trichloroethane at a very low concentration, or at threshold conditions, the following two examples demonstrate the use of higher concentrations of this mixture in 1,1,1-trichloroethane.

EXAMPLE II

The foregoing example is repeated in all details except that in this instance a 2 weight percent concentration of the tricomponent mixture of ethyl acetate, 1,3-dioxolane and nitromethane in 1,1,1-trichloroethane is used and the refluxing is conducted for a period of 12 hours. The stabilizing effect of the system is evidenced by the time required for the metal strips to show any loss of weight and is far superior to the results obtained by the use of a lower rate composition of the said mixture of stabilizers in 1,1,1-trichloroethane solvent. The superiority of the three component mixture of stabilizers over the use of the individual components and over the stabilizer pair consisting of a dioxolane compound and an aliphatic carboxylic ester at an even higher concentration is again demonstrated in the following example.

EXAMPLE III

The foregoing example is again repeated except that in this instance a 5 weight percent solution of the mixture of ethyl acetate, 1,3-dioxolane and nitromethane in 1,1,1-trichloroethane is formed. Superior results are again obtained over that of 1,1,1-trichloroethane solvent compositions stabilized with the individual components, or with the said two component system consisting of an aliphatic carboxylic ester and a dioxolane compound.

Having demonstrated the advantages derived from the use of a system or mixture of ethyl acetate, 1,3-dioxolane and nitromethane, respectively, the following examples will show the use of other members of these classes in 1,1,1-trichloroethane.

EXAMPLE IV

Nitromethane, methyl acetate and 4-methyl-5-ethyl-1,3-dioxolane are employed as the stabilizing mixture for 1,1,1-trichloroethane. Again, as in the foregoing, highly satisfactory results are obtained.

EXAMPLE V

Nitromethane, ethynyl acetate and 2,4-dimethyl-1,3-dioxolane are employed as the stabilizing mixture for 1,1,1-trichloroethane. Again, highly satisfactory results are obtained. The advantages are clearly superior over the use of any of these components individually to stabilize 1,1,1-trichloroethane.

EXAMPLE VI

In this instance the stabilizing mixture consists of nitromethane, ethynyl butyrate and 2-methyl-5-ethyl-1,3-dioxolane. Again, as in the foregoing examples, highly satisfactory results are obtained. The use of the mixture is better than the components used individually to stabilize 1,1,1-trichloroethane.

EXAMPLE VII

In this instance the stabilizing mixture consists of ethyl butyrate, nitromethane and 2,2-diethyl-1,3-dioxolane. Again, as in the foregoing examples, highly beneficial results are obtained by the use of the mixture as contrasted with the use of individual components.

EXAMPLE VIII

Examples IV through VII are again repeated except that in this instance the aliphatic carboxylic ester employed in the stabilizing mixtures is methyl crotonate. Again, highly beneficial results are obtained by the use of these mixtures as contrasted with the use of these components singularly.

EXAMPLE IX

Examples IV through VII are again repeated except that in this instance the aliphatic carboxylic ester, methyl 3-butyrate, is employed as one of the components of the mixtures used to stabilize the 1,1,1-trichloroethane solvent. Again, as in the foregoing examples, highly desirable compositions result. The benefits derived from the use of these mixtures are superior to those of any of the components used individually.

EXAMPLE X

Examples IV through VII are again repeated except that in this instance methyl acrylate replaces the aliphatic carboxylic esters used to stabilize the 1,1,1-trichloroethane solvent. Again, as in the foregoing examples, the use of these mixtures produces highly desirable results, and the properties of the mixtures are superior to those of any of the components used individually.

EXAMPLE XI

Examples IV through VII are again repeated except that in this instance ethyl propionate replaces the aliphatic carboxylic esters used to stabilize 1,1,1-trichloroethane. As in the foregoing examples, satisfactory systems result and the properties of the 1,1,1-trichloroethane solvents to which have been added the stabilizing mixtures are superior to the properties of any of those components used individually.

EXAMPLE XII

Examples IV through XI are repeated except that in this instance nitroacteylene is added to the stabilizing mixtures for 1,1,1-trichloroethane. Again, highly satisfactory results are obtained. The advantages are clearly superior over the use of any of these components individually, or of the original two component mixtures used to stabilize 1,1,1-trichloroethane.

EXAMPLE XIII

Examples IV through XI are again repeated except that in this instance 2-nitropropane is added to the stabilizing mixtures. Again, as in the foregoing examples, highly satisfactory results are obtained. The use of these mixtures are better than the components used individually, or of the two component mixtures used to stabilize 1,1,1-trichloroethane.

EXAMPLE XIV

Examples IV through XI are again repeated except that in this instance 2-nitro-1-propene is added to the stabilizing mixtures. Again, as in the foregoing examples, highly beneficial results are obtained by the use of these mixtures as contrasted with the use of any component individually, or of any two component mixtures.

EXAMPLE XV

Examples IV through XI are again repeated except that in this instance 1-nitro-2-propyne is added to the stabilizing mixtures. Again, highly beneficial results are obtained by the use of these mixtures, as contrasted with the use of the components singularly, or with the use of the two component mixtures.

EXAMPLE XVI

All of the foregoing examples are again repeated except that in this instance the chlorinated hydrocarbon solvent stabilized is 1,1,2-trichloroethylene. Highly desirable stabilized solvent compositions result, and compositions which are superior to those resulting from the use of any of the components of the mixture used alone to stabilize the 1,1,2-trichloroethylene solvent. The three component systems used to stabilize the 1,1,2-trichloroethylene solvent is also superior to a two component stabilized solvent composition.

EXAMPLE XVII

The foregoing examples are again repeated except that in this instance the chlorinated hydrocarbon solvent which is stabilized is carbon tetrachloride, ethylene dichloride and perchloroethylene, respectively. Again, highly stable compositions result, these being superior to the stabilized compositions which result from the use of any of the components individually. Also the three component mixture is superior to a two component mixture used to stabilize the solvents.

The following examples demonstrate a variety of corrosion inhibitor compositions which are a preferred embodiment of the present invention. The various nitroaliphatic, aliphatic carboxylic ester and dioxolane components of the corrosion inhibitor compositions and the weight percent of each component within the respective corrosion inhibitor composition is as shown in the following table:

*Table II*

| Example | Nitroaliphatic Compound | Aliphatic Carboxylic Ester Compound | Dioxolane Compound |
|---|---|---|---|
| XVIII | Nitroethylene | Methyl Acetate | 1,3-Dioxolane. |
| XIX | Nitroacetylene | Ethyl Acetate | 2-Methyl-1,3-Dioxolane. |
| XX | 1-Nitropropane | Isopropyl Acetate | 2-Ethyl-1,3-Dioxolane. |
| XXI | 1-Nitro-2-Propane | n-Propyl Acetate | 2-Methyl-2-Ethyl-1,3-Dioxolane. |
| XXII | 2-Nitro-1-Propene | Butyl Acetate | 2,2-Dimethyl-1,3-Dioxolane. |
| XXIII | 2-Nitropropane | Methyl Propionate | 2,2-Diethyl-1,3-Dioxolane. |
| XXIV | 2-Nitro-1-Propene | Ethyl Propionate | 4-Methyl-1,3-Dioxolane. |
| XXV | Nitroethane | Isopropyl Propionate | 5-Ethyl-1,3-Dioxolane. |
| XXVI | Nitromethane | Methyl Butyrate | 1,3-Dioxolane. |
| XXVII | 1-Nitropropane | Ethyl Butyrate | 2-Methyl-4-Ethyl-1,3-Dioxolane. |
| XXVIII | 2-Nitropropane | Methyl Acetate | 4,5-Diethyl-1,3-Dioxolane. |
| XXIX | 2-Nitro-1-Propene | Isopropyl Acetate | 4,4-Dimethyl-1,3-Dioxolane. |
| XXX | Nitroacetylene | Ethyl Propionate | 4-Methyl-4-Ethyl-1,3-Dioxolane. |
| XXXI | Nitroethylene | Methyl Butyrate | 5,5-Diethyl-1,3-Dioxolane. |
| XXXII | 2-Nitro-1-Propene | do | 4-Methyl-5-Ethyl-1,3-Dioxolane. |

The stabilizing mixtures or corrosion inhibitor compositions shown in Examples XVIII through XXXII, of Table II, are added to 1,1,1-trichloroethane to form stabilized 1,1,1-trichloroethane compositions. The corrosion inhibitor compositions are added to the 1,1,1-trichloroethane in sufficient quantity to form 0.3, 0.5, 1, 2, 4, 5, 10, and 12 weight percent compositions of the stabilizing mixtures in 1,1,1-trichloroethane.

The procedure described in Example I is repeated with each of these stabilized 1,1,1-trichloroethane compositions and, as in Example I, the solvents show little or no signs of decomposition. The metals also show little or no signs of chemical attack.

When this same procedure is repeated with the exception that the metals are completely immersed within the stabilized 1,1,1-trichloroethane solvent, similar results are obtained.

The corrosion inhibitor compositions of Examples XVIII through XXXII are added to 1,1,2-trichloroethane, carbon tetrachloride, ethylene dichloride, and perchloroethylene, respectively, in sufficient quantity to form 0.3, 0.5, 1, 2, 4, 5, 10 and 12 weight percent compositions of the stabilizing mixture in each of the respective chlorinated hydrocarbon solvents. The procedure described in Example I is then again repeated with each of these compositions. As in Example I the solvent compositions show little or no signs of decomposition and the metals are essentially unattacked.

It will be understood that certain minor modifications can be made in the above process without departing from the spirit and scope of the invention. For example, it will be understood that "metal" as used in the foregoing specification includes at least aluminum, iron and copper. It is also used to include the various alloys as well as the elemental metal. By "inhibiting amount" of the compounds is meant any amount thereof added to stabilize the various chlorinated hydrocarbon solvents against decomposition. A certain minimum concentration of the mixed stabilizers must be added to effectively stabilize the chlorinated hydrocarbon solvents, i.e., on the order of about a 0.3 percent weight concentration of the mixture based on the weight of the said stabilized solvent, though this can vary slightly with temperature and with the number and quantity of other materials present which tend to accelerate the reaction. The upper concentration limit of the mixed stabilizers in the chlorinated hydrocarbon solvents is much less critical, any concentration greater than the minimum concentration producing a stabilized solvent. Greater concentrations can be used quite successfully.

This application is a continuation-in-part of application Serial No. 776,673, filed November 28, 1958, now abandoned.

Having described the invention, what is claimed is:

1. A stable solvent composition for metal degreasing, comprising a chlorinated hydrocarbon composition having at least about 0.3 weight percent of a stabilizing mixture dissolved therein, sufficient to inhibit the composition against decomposition, said stabilizing mixture consisting essentially of a nitroaliphatic hydrocarbon compound, an aliphatic carboxylic acid ester, and a dioxolane compound, said nitroaliphatic hydrocarbon compound having not more than 3 carbon atoms, said aliphatic carboxylic acid ester being characterized by containing hydrocarbyl substituents having from 1 to about 3 carbon atoms, and said dioxolane compound being a 1,3-dioxolane compound containing up to 2 alkyl substituents each having from 1 to 2 carbon atoms.

2. A stable solvent composition for metal degreasing, comprising a 1,1,1-trichloroethane composition having at least about 0.3 weight percent of a stabilizing mixture dissolved therein, sufficient to inhibit the composition against decomposition, said stabilizing mixture consisting essentially of a nitroaliphatic hydrocarbon compound, an aliphatic carboxylic acid ester, and a dioxolane compound, said nitroaliphatic hydrocarbon compound having not more than 3 carbon atoms, said aliphatic carboxylic acid ester being characterized by containing hydrocarbyl substituents having from 1 to about 3 carbon atoms, and said dioxolane compound being a 1,3-dioxolane compound containing up to 2 alkyl substituents each having from 1 to 2 carbon atoms.

3. The composition of claim 2 wherein the nitroaliphatic compound is nitromethane.

4. The composition of claim 2 wherein the aliphatic carboxylic acid ester is ethyl acetate.

5. The composition of claim 2 wherein the dioxolane compound is 1,3-dioxolane.

6. A stable solvent composition for metal degreasing, comprising a 1,1,2-trichloroethane composition having at least about 0.3 weight percent of a stabilizing mixture dissolved therein, sufficient to inhibit the composition against decomposition, said stabilizing mixture consisting essentially of a nitroaliphatic hydrocarbon compound, an aliphatic carboxylic acid ester, and a dioxolane compound, said nitroaliphatic hydrocarbon compound having not more than 3 carbon atoms, said aliphatic carboxylic acid ester being characterized by containing hydrocarbyl substituents having from 1 to about 3 carbon atoms, and said dioxolane compound being a 1,3-dioxolane compound containing up to 2 alkyl substituents each having from 1 to 2 carbon atoms.

7. A stable solvent composition for metal degreasing, comprising a chlorinated hydrocarbon solvent selected from the group consisting of 1,1,1-trichloroethane, 1,1,2-trichloroethylene, 1,1,2-trichloroethane, carbon tetrachloride, ethylene dichloride and perchloroethylene, said chlorinated hydrocarbon solvent having at least about 0.3 weight percent of a stabilizing mixture dissolved therein, sufficient to inhibit the composition against decomposition, said stabilizing mixture consisting essentially of a nitroaliphatic hydrocarbon compound, an aliphatic carboxylic acid ester, and a dioxolane compound, said nitroaliphatic hydrocarbon compound having not more than 3 carbon atoms, said aliphatic carboxylic acid ester being characterized by containing hydrocarbyl substituents having from 1 to about 3 carbon atoms and said dioxolane compound being a 1,3-dioxolane compound containing up to 2 alkyl substituents each having from 1 to 2 carbon atoms.

8. A stable solvent composition for metal degreasing comprising 1,1,1-trichloroethane having dissolved therein from 1 to 4 weight percent of a mixture of nitromethane, ethyl acetate and 1,3-dioxolane.

9. The composition of claim 6 wherein the nitroaliphatic compound is nitromethane.

10. The composition of claim 6 wherein the aliphatic carboxylic acid ester is ethyl acetate.

11. The composition of claim 6 wherein the dioxolane compound is 1,3-dioxolane.

12. A stable solvent composition for metal degreasing comprising 1,1,2-trichloroethylene having dissolved therein from 1 to 4 weight percent of a mixture of nitromethane, ethyl acetate, and 1,3-dioxolane.

13. A chlorinated hydrocarbon solvent corrosion inhibitor composition composed of a mixture of from about 10 percent to about 80 percent of a nitroaliphatic hydrocarbon compound, from about 10 percent to about 80 percent of an aliphatic carboxylic acid ester, and from about 10 percent to about 80 percent of a dioxolane compound, based on the total weight of the corrosion inhibitor composition, said nitroaliphatic hydrocarbon compound having not more than 3 carbon atoms, said aliphatic carboxylic acid ester being characterized by containing hydrocarbyl substituents having from 1 to about 3 carbon atoms, and said dioxolane compound being a 1,3-dioxolane compound containing up to 2 alkyl substituents each having from 1 to 2 carbon atoms.

14. The composition of claim 1 wherein from about 0.3 to about 12 weight percent of the stabilizing mixture is dissolved within the chlorinated hydrocarbon.

15. The composition of claim 2 wherein from about 0.3 to about 12 weight percent of the stabilizing mixture is dissolved within the 1,1,1-trichloroethane.

16. The composition of claim 2 wherein the nitroaliphatic hydrocarbon compound is nitromethane, the aliphatic carboxylic acid ester is ethyl acetate, and the dioxolane compound is 1,3-dioxolane.

17. The composition of claim 2 wherein from about 1 to about 4 weight percent of the stabilizing mixture is dissolved within the 1,1,1-trichloroethane.

18. The composition of claim 6 wherein from about 0.3 to about 12 weight percent of the stabilizing mixture is dissolved within the 1,1,2-trichloroethane.

19. The composition of claim 7 wherein from about 0.3 to about 12 weight percent of the stabilizing mixture is dissolved within the chlorinated hydrocarbon solvent.

References Cited in the file of this patent

UNITED STATES PATENTS

| | | |
|---|---|---|
| 2,371,645 | Aitchison et al. | Mar. 20, 1945 |
| 2,371,647 | Petering et al. | Mar. 20, 1945 |
| 2,567,621 | Skeeters et al. | Sept. 11, 1951 |
| 2,818,446 | Starks | Dec. 31, 1957 |